United States Patent

Worgan et al.

[11] 3,892,099
[45] July 1, 1975

[54] MEANS FOR FASTENING OF SANDWICH PANELS TO SUPPORTS

[75] Inventors: Gordon Peter Worgan, Yate; Gordon John Lane, Henleaze, both of England

[73] Assignee: Rolls-Royce (Composite Materials), Bristol, England

[22] Filed: Sept. 7, 1973

[21] Appl. No.: 395,064

Related U.S. Application Data

[63] Continuation of Ser. No. 161,537, July 12, 1971, abandoned.

[30] Foreign Application Priority Data

July 16, 1970 United Kingdom............ 34588/70

[52] U.S. Cl. .................... 52/479; 52/483; 52/617
[51] Int. Cl. ............................................ E04c 2/34
[58] Field of Search ......... 52/617, 483, 479; 161/68

[56] References Cited
UNITED STATES PATENTS

| | | | |
|---|---|---|---|
| 2,585,557 | 2/1952 | Kreimendahl | 52/617 |
| 2,607,447 | 8/1952 | Tuttle | 52/617 |
| 2,967,593 | 1/1961 | Cushman | 52/617 |
| 3,042,156 | 7/1962 | Rohe | 52/617 |
| 3,137,887 | 6/1964 | Mannino et al. | 52/617 |
| 3,282,015 | 11/1966 | Rohe et al. | 52/617 |
| 3,282,015 | 11/1966 | Rohe et al. | 52/617 |
| 3,384,142 | 5/1968 | Phelan | 52/617 |
| 3,434,262 | 3/1969 | Lawrence | 52/617 |
| 3,443,473 | 5/1969 | Tritt | 52/617 X |
| 3,526,072 | 9/1970 | Campbell | 52/617 |
| 3,651,563 | 3/1972 | Volkmann | 52/617 X |
| 3,716,092 | 2/1973 | Serewicz | 52/617 |

OTHER PUBLICATIONS

"Advanced Composite Materials in Spacecraft," Pgs. 136, 137, 140, Modern Plastics, Sept. 1970, J. D. Forest.

"Greater Stiffness for RP," Modern Plastics, T. W. Langley, Dec. 1967, pgs. 122, 123.

"Carbon Fiber," Bacon et al., pgs. 608–610, Feb. 8, 1966, Union Carbide Corp.

Primary Examiner—Frank L. Abbott
Assistant Examiner—Leslie A. Braun
Attorney, Agent, or Firm—Larson, Taylor & Hinds

[57] ABSTRACT

A panel removably secured to a support by a fastener means, the panel consisting of a first and a second skin of a material reinforced by fibers, on either side of a cellular core, with a hole through the first skin and the core and a smaller concentric hole through the second skin, reinforced by a flat annulus bonded to the other face of the second skin around the smaller hole, and by an insert consisting of a tubular portion lining the hole in the core, an external flange bonded to the outer face of the first skin, and an internal flange bonded to the inner face of the second skin around the smaller hole, the annular engaging the support, and the fastener means including a shank passing through the holes in the internal flange, the second skin, and the annulus into the support, and a portion having a clamping face engaging the internal flange and exerting a clamping force on the internal flange, second skin, and annulus against the support, the said portion having radial clearance within the tubular portion.

11 Claims, 1 Drawing Figure

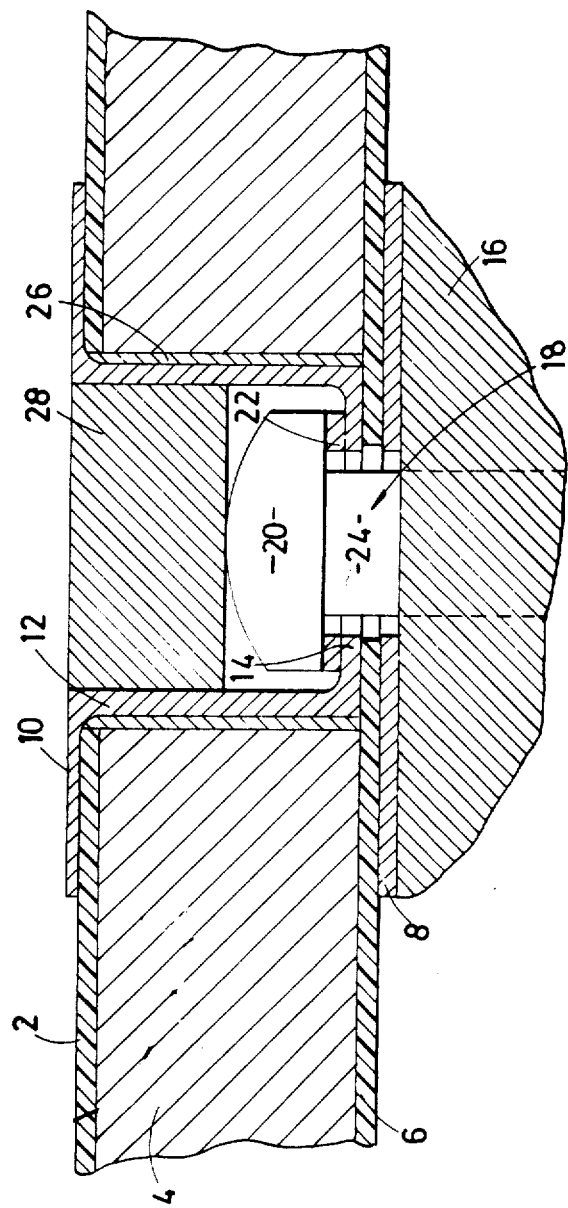

MEANS FOR FASTENING OF SANDWICH PANELS TO SUPPORTS

This is a continuation of application Ser. No. 161,537 filed July 12, 1971 now abandoned.

In passenger aircraft, the practice is to construct a cabin floor of panels which are removably fastened to supporting structure.

The panels require to be as light as possible, while being able to carry the loading to which they are subjected in use. To help keep down the weight, it is desirable for the fasteners to act not merely as locating means, but as means for transferring from the panel to the supporting structure loads acting in directions parallel to the main plane of the panel.

Existing fasteners for this purpose tend to set up high local strain in a panel. If the panel has metal skins, on either side of a cellular core, the plastic behaviour of the metal above the yield point will enable such local strain to be accommodated without general failure of the panel. This is not true of panels with skins made of materials reinforced by fibres, which have a low value of strain at breaking point.

This invention relates to fastening arrangements which have been particularly developed for use with panels having an upper and a lower skin each of plastics material reinforced with carbon fibres, but which may be applied to panels of other composite materials, e.g. aluminium reinforced by boron fibres.

According to this invention, a panel is removably secured to a support by a fastener means, the panel comprising a first and a second skin of a material reinforced by fibers, on either side of a cellular core, with a hole through the first skin and the core and a smaller concentric hole through the second skin, reinforced by a flat annulus adhesively bonded to the outer face of the second skin around the smaller hole, and by an insert comprising a hollow tubular portion extending axially into and lining the hole in the core, an external flange at one end of the tubular portion and adhesively bonded to the outer face of the first skin, and a radially inwardly extending internal flange at the other end of the tubular portion and adhesively bonded to the inner face of the second skin around the smaller hole, the annulus engaging the support, and the fastener means including a shank passing through the holes in the internal flange, the second skin, and the annulus into the support, and a head portion having a clamping face within the hollow tubular portion exerting a clamping force on the internal flange, second skin, and annulus against the support, the head portion having radial clearance within the tubular portion.

The accompanying drawing shows one example of a fastening arrangement embodying this invention.

This drawing is a vertical section through the fastening arrangement.

The panel consists of an upper skin 2, a core 4 and a lower skin 6. In the example, the overall thickness of the panel is 0.375 inch (9.6 mm), the skins are each 0.015 inch (0.38 mm) thick, and the core is of lightweight honeycomb. The skins are of epoxy or phenolic resin, reinforced with carbon fibres. The honeycomb is of phenolic resin paper reinforced with nylon fibres. Other materials may of course be used for the skins and for the cellular core. Examples of other core materials are glass or aluminium honeycomb and plastics foams.

An annulus 8 of metal is bonded to the outer face of the lower skin. An insert, integrally formed of metal, comprises an external flange 10 bonded to the outer face of the upper skin, a cylindrical tubular portion 12, and an internal flange 14 bonded to the inner face of the lower skin. The annulus 8 and the flange 10 are each 0.015 inch (0.38 mm) thick and 0.940 inch (24.0 mm) in external diameter. The wall thickness of the portion 12 is 0.0275 inch (0.70 mm). The tubular portion is 0.45 inch (11.3 mm) in external diameter. The annulus and the insert are of titanium. Other metals may be used. Examples are stainless steels and aluminium alloys. As an alternative to metal, the annulus and the insert may be of a high-strength plastics material, e.g. an acetal resin. The bonding of the annulus 8 and of the flange 10 to the skins is by an epoxy resin adhesive. Other adhesives may be used.

The broken cells of the core around the tubular portion are preferably filled with adhesive, as shown at 26, but this is not essential.

The annulus abuts a support 16. A bolt 18 is inserted through the insert and the annulus into threaded engagement (not shown) with the support. The bolt has a head 20 with a clamping surface which, via a washer 22, engages the internal flange 14, and, when the bolt is tightened, clamps the sandwich constituted by the flange 14, the lower skin 6, and the annulus 8 against the support 16.

Forces acting parallel to the general plane of the panel, e.g. from left to right in the drawing, are transferred to the support partly by friction between the annulus 8 and the support, and partly as bending loads on the bolt 18. The annulus and insert serve to ensure transfer of loads from the skins of the panel to the fastener without excessive local strain. The short distance from the bolt head to the support keeps bending strains to a minimum.

The bolt shank 24 may be a close fit or a clearance fit in the holes in the internal flange 14 and the annulus 8, but clearance must remain around the head of the bolt even if the panel shifts to take up any clearance between the panel and the bolt shank. The hole through the flange 14 and annulus 8, in which the bolt shank fits, is drilled or reamed after the annulus and insert are in place. The bolt is tightened with a torque wrench to a torque of 35 lbs ft. (4.8 Kg m). The safe working load is 1,000 lb (445 Kg).

In a typical use in aircraft flooring, a plurality of bolts are used, spaced 6 inches (153 mm) apart.

A lightweight plug 28 is fitted into the tubular portion on top of the bolt head, to give a flush upper surface. When the bolt is to be released, the plug is prised out with a pointed tool.

As alternatives to the example shown, the tubular portion may be non-cylindrical, e.g. frusto-conical, divergent upwards. The tubular portion is not necessarily circular in plan.

For aircraft flooring, threaded fasteners, such as the bolts 18, are preferred, but for other purposes e.g. access panels, other fasteners, e.g. spring-type fasteners, may be used.

We claim:

1. A panel removably secured to a support by a fastener means; the panel comprising a first and a second skin of a material reinforced by fibers, on either side of a cellular core, with a hole through the first skin and the core and a smaller concentric hole through the second skin, reinforced by a flat annulus adhesively bonded to the outer face of the second skin around the smaller hole, and by an insert comprising a hollow tubular portion extending axially into and lining the hole in the core, an external flange at one end of the tubular portion and adhesively bonded to the outer face of the first skin, and a radially inwardly extending internal flange at the other end of the tubular portion and adhesively bonded to the inner face of the second skin around the smaller hole; the annulus engaging the support; and the fastener means including a shank passing through the holes in the internal flange, the second skin, and the annulus into the support, and a head portion having a clamping face within said hollow tubular portion exerting a clamping force on the internal flange, second skin, and annular against the support, the said head portion having radial clearance within the tubular portion.

2. Apparatus as claimed in claim 1 wherein said fibers have a low value of strain at breaking point.

3. Apparatus as claimed in claim 2 wherein said skins are of plastics material.

4. Apparatus as claimed in claim 3 wherein said fibers are carbon fibers.

5. Apparatus as claimed in claim 4 wherein said skins are of epoxy or phenolic resin.

6. Apparatus as claimed in claim 2 wherein said fibers are boron fibers.

7. Apparatus as claimed in claim 1 wherein said annulus is of a diameter substantially larger than any radial dimension of said tubular portion.

8. Apparatus as claimed in claim 7 wherein said annulus is of a diameter approximately equal to said external flange.

9. Apparatus as claimed in claim 1 wherein said head portion is radially enlarged relative to said shank and said smaller hole and is recessed within said tubular portion.

10. Apparatus as claimed in claim 9 wherein said head portion is formed for engagement by a rotary driving tool from the side opposite said support.

11. Apparatus as claimed in claim 10 wherein said shank is unthreaded where it passes through said internal flange.

* * * * *